United States Patent Office 2,697,159
Patented Dec. 14, 1954

2,697,159

WELDING ELECTRODE AND COATING AND METHOD OF MAKING THE SAME

John W. Donahey, Drexel Hill, Pa., assignor to Foote Mineral Company, Philadelphia, Pa., a corporation of Pennsylvania No Drawing. Application August 14, 1951, Serial No. 241,900

20 Claims. (Cl. 219—8)

The present invention relates to a novel flux-containing coating for welding electrodes and to the method of making such coating; and more particularly, the invention relates to a glass-bonded, flux-containing coating for welding electrodes possessing novel properties representing a marked improvement in the welding art. The invention also relates to a novel flux-coated welding electrode.

Flux-coated welding electrodes are well known. Such articles, as manufactured for years, consist of a metal rod, the electrode, having a coating of flux particles thereon, the flux particles being bonded together and to the electrodes by sodium or potassium silicate. In recent years, particularly with the development of the welding of low alloy steel during World War II, a serious problem presented itself in that fine cracks were evident in the deposited weld metal and in the heat-affected area surrounding the deposited weld metal. Belief that the embrittlement causing the cracks was due to hydrogen, led to investigations to determine the source of the hydrogen. The realization that certain of the fluxing ingredients in the coating, such as hydrous silicates, containing water of crystallization, resulted in a change to anhydrous flux materials. But the difficulty persisted.

It has been found that the primary source of hydrogen is moisture in the binding material used in the coating. The soluble silicates, i. e., sodium and potassium silicates, being hygroscopic materials, retain much of the water employed in the application of the coating to the electrode. Baking of such silicate-bonded electrode coatings, even at temperatures as high as 900° F., does not remove all the water, and, in any event, the coating rapidly re-absorbs moisture from the atmosphere, particularly under conditions of high humidity. Packaging of such coated welding electrodes in moisture-vapor proof containers, even before the electrodes have completely cooled from the original baking temperature, is a costly and cumbersome procedure, and does not satisfactorily solve the problem, since upon the opening of the container and the removal of the electrodes therefrom, moisture is re-absorbed by the coating. Hence re-baking of the coated electrodes before use must often be resorted to.

It is the principal object of the present invention to provide a welding electrode coating that is free of the above-mentioned disadvantages of presently available welding electrode coatings.

Another object of the present invention is to provide a welding electrode coating that is substantially free of mechanically-held moisture and which will not absorb any significant amount of moisture upon exposure to the atmosphere even under conditions of very high humidity.

Still another object of the present invention is to provide a flux-containing welding electrode coating which is free of chemically-combined and mechanically-held moisture, and which will not require the packing of the flux-coated electrode in moisture-vapor proof containers or re-baking thereof just prior to use.

Still another object of the invention is to provide a flux-containing welding electrode coating which possesses improved properties, including improved mechanical strength and improved burn-off rate as compared to conventional welding electrode coatings.

Still another object of the present invention is to provide a method of applying a flux-containing coating to welding electrodes wherein the coating possesses the afore-mentioned advantageous properties.

Other objects, including the provision of an improved flux-coated welding electrode, will be apparent from the following specification and the claims.

The novel welding electrode coating of the present invention comprises flux ingredients, in relatively fine particle size and in discrete particle form bound together and to a welding electrode by a low melting hydrophobic, water-insoluble fused glass.

In applying the coating, in accordance with the present invention, the flux ingredients, in relatively fine particle size, and the glass binder, in the form of a frit also in relatively fine particle size, are mixed together and with sufficient liquid to form a plastic mass. Preferably, a small amount of an organic material for imparting supplemental plasticity and temporary bonding properties to the mix is incorporated therein. The mixture is applied to the welding electrode, and the product is heated to drive off the liquid, and any organic material employed, and to cause the glass particles to soften, wetting the flux particles and welding electrode. On cooling, the glass solidifies rigidly bonding the flux particles together and to the electrode.

The glass binder will, as stated, comprise a low melting glass. The glass must soften and flow at a temperature below that at which the flux ingredients are affected, that is, below the temperature at which the flux ingredients melt, decompose, oxidize or otherwise become physically or chemically altered. Welding flux ingredients are generally not so affected at temperatures below about 1250° F. to insure, however, that, during the application of the coating, the flux ingredients are not affected, it is desirable that the glass binder soften and flow under its own weight at temperatures below about 1250° F. A convenient test for determining whether any particular glass possesses the requisite fusion flow characteristics for use in accordance with the present invention is the Kinzie fusion flow method described in the Journal of the American Ceramic Society, vol. 15, No. 6, 1932, pp. 357–360. Glasses having the proper fusion flow characteristics for use in accordance with the present invention are those which will soften and flow under their own weight when heated at 1200° F. for 5 minutes.

As also stated above, the glass binder will be hydrophobic, or non-hygroscopic, that is, will not absorb any appreciable amount of moisture from the atmosphere. A suitable test for determining the moisture-absorptive properties of any particular glass is to subject it, at a fineness of 200 mesh, to a relative humidity of 90% for one week. Glasses that absorb less than about 1% of moisture, when subjected to such conditions, possess the requisite hydrophobic properties for use in accordance with the present invention. The glass binder will also be water-insoluble as stated above. With respect to the water-solubility properties of glasses, such property may be measured by subjecting a sample of the glass, of a fineness of 200 mesh, to leaching with pure water at 80° F. for two days. Those glasses which exhibit a weight loss of less than about 3%, under such conditions, possess the requisite water-insolubility for use in accordance with the present invention.

A particularly advantageous glass possessing the above-mentioned properties is an alkali titania silicate glass having an analysis comprising oxides of at least two of the alkali metals selected from the group consisting of sodium, potassium, lithium and rubidium in an amount between about 20 mol percent and about 40 mol percent; at least one of the divalent metal oxides selected from the group consisting of CaO, MgO, SrO, CdO, MnO, FeO, CoO and NiO in an amount between about 5 mol percent and about 20 mol percent; the total of said alkali metal and divalent metal oxides being between about 30 mol percent and about 55 mol percent, and the mol ratio of the said alkali metal oxides to said divalent metal oxide being between about 2:1 and about 8:1; $SiO_2$ in an amount between about 30 mol percent and about 60 mol percent, and $TiO_2$ in an amount between about 2 mol percent and about 25 mol percent. Such glass may also contain minor amounts of other materials. For example, it may include $B_2O_3$ in amounts up to about 40 mol percent, and at least one of the trivalent metal oxides selected from the group consisting of $Al_2O_3$ and $Fe_2O_3$ in amounts up to about 10 mol percent. It may also, and preferably does, contain fluorine in an amount up to that equivalent to about 20 mol percent $Na_2F_2$. Where fluorine is incorporated in the glass it advantageously is present at least in an amount equivalent to about 0.5 mol percent of $Na_2F_2$. Glasses having the stated composition are particularly applicable for use in connection with the present invention, and the invention will be described with particular emphasis on such glass although it will be realized that any glass possessing the above-mentioned physical characteristics may be used if desired.

One of the primary features of the coating of the present invention is the fact that the glass binder portion thereof is substantially free of mechanically-held moisture, and even upon being subjected to very high humidity conditions, the binder will not absorb moisture to any significant extent. This is to be contrasted to sodium silicate- or potassium silicate-bonded coatings which may absorb as much as 5–6% of moisture upon being subjected to relatively high humidity. The coatings of the present invention are also characterized as having greater mechanical strength and as providing a higher "burn-off" rate than conventional sodium-silicate or potassium silicate-bonded coatings. That is, it has been found that the coating of the invention is more readily melted than prior coatings, thus permitting more rapid welding. While the exact reason for this improved property is not fully understood, it is believed to result from the fact that the glass binder of the present coating, being prefused, requires less energy to be melted.

As stated above, the glass binding material is in the form of a frit in relatively fine particle size when the flux ingredients are incorporated therewith and the mixture applied to the welding electrode. The glass frit may be prepared in accordance with conventional frit-making practice. As is well-known, in preparing a frit, materials providing ultimately the desired analysis—in the present case compounds providing, for example, the above-described oxide analysis—are first mixed together and melted. With respect to the materials employed to provide the desired composition, such material may be selected from a wide range of well-known compounds and minerals, and the provision of, for example, the above-described chemical analysis will present no problem to those skilled in the art. Thus, the alkali metal oxides may be provided by carbonates, nitrates, fluorides, minerals and the like, for example, lithium carbonate, potassium carbonate, rubidium carbonate, soda ash, lithium nitrate, potassium nitrate, sodium nitrate, sodium fluoride, potassium fluoride, and the like. Lepidolite, for example, may serve as a source of $Rb_2O$, $Li_2O$ and $K_2O$. Where $B_2O_3$ is desired in the glass, some or all of the alkali metal oxide and $B_2O_3$ may be provided by the use of alkali metal borates, such as borax. Likewise, the divalent metal oxide may be provided by the corresponding carbonate, nitrate, and the like, or, in some cases, the oxide itself may be used. $SiO_2$ and $TiO_2$ may be used as such or may be provided by other compounds or minerals, for example, silicates or titanates. $Al_2O_3$ and $Fe_2O_3$ may be used as such or provided from another compound, for example, the hydroxide, silicates, or the like, $B_2O_3$, where desired in the glass may be provided by the use of borates, such as borax, as stated above, or by the use of boric acid. Fluorine may be provided by the use of alkali metal or alkaline earth metal fluorides, such as sodium fluoride, lithium fluoride, calcium fluoride, barium fluoride, and the like, and complex fluorides, such as cryolite, lepidolite, and the like. During melting, in the preparation of the frit, some fluorine may be lost due to volatilization, the exact amount depending upon the fritting procedure followed. When the presence of fluorine is desired, the amount of fluorine source will, therefore, be selected with this in mind to provide fluorine within the amount stated above. During melting, volatile constituents of the various compounds will be liberated and driven off. For example, where carbonates are employed, carbon dioxide is driven off.

The materials providing the desired chemical analysis within the ranges set forth above upon melting thereof, are mixed together in accordance with common practice and heated to an elevated temperature to provide a clear, pourable, molten mass. With compositions corresponding to the analysis set forth herein, a temperature between about 1600° F. and about 2000° F. will be sufficient.

The molten mass is then quickly chilled, such as by pouring it into a water bath, and such quick chilling causes the glassy mass to fracture into small pieces. These small pieces are recovered and dried to provide the frit having the chemical analysis described above.

The resulting frit may be too coarse for direct use, and may, therefore, require grinding. Grinding may be carried out in conventional grinding apparatus, for example, in a jar mill, rod mill, or the like. Grinding reduces the coarse frit to the desired fine particle size. Generally, the particle size of the ground frit will be less than about 40 mesh and may be as fine as about 325 mesh. Preferably, the particle size of the frit is between about 100 and about 200 mesh.

In preparing the coating material in accordance with the present invention, a minor proportion of the above-described glass frit is mixed with the desired welding flux ingredients. The specific flux ingredients employed, as is well known, may be selected from a wide variety of materials depending upon many factors, including the type of weld metal, the type of metal being welded, the conditions of welding, certain properties desired in the coating, e. g., whether it will provide a shielded arc or not, and the like. The types and combinations of flux ingredients are immaterial from the standpoint of the present invention, the invention being concerned with a novel manner of securing welding flux ingredients in general to a welding electrode. The glass binder of the present invention is applicable for use with all welding flux materials inasmuch as the temperature required for fusing the glass binder will be such as will not adversely effect the fluxing ingredients. As a general rule, welding flux ingredients are water-insoluble, inorganic compounds which are relatively stable at temperatures below about 1250° F.

By way of illustration the following fluxing ingredients are given; carbonates (especially for use in shielded-arc flux coatings) such as calcium carbonate, magnesium carbonate, dolomite, lithium carbonate, and the like; fluorides, such as calcium fluoride, sodium fluoride, lithium fluoride, cryolite, fluorspar, and the like; oxides, such as iron oxide (e. g. hematite and/or magnetite), manganese oxide (e. g. manganese ore, hausmannite ($Mn_3O_4$) and/or manganous oxide), silicon dioxide, titanium dioxide (e. g. rutile and/or ilmenite), zirconium dioxide, nickel oxide, columbium oxide, and the like; silicates, such as aluminum silicate (e. g. clays, mica, feldspar, pyrophyllite, lepidolite, spodumene, etc.), calcium silicate (e. g. wollastonite), magnesium silicate (e. g. asbestos, talc, etc.), and the like; titanates, such as potassium titanate, and the like; metallics for alloying with the weld metal, such as ferromanganese, ferrosilicon, ferrotitanium, ferrochromium, ferrozirconium, ferrovanadium, ferrocolumbium, iron, silicon, manganese, tungsten, molybdenum, and the like. Typical combinations of these various materials are set forth hereinafter in the specific examples.

From the standpoint of the broader aspect of the present invention, it is relatively immaterial whether the flux ingredients selected are hydrous or anhydrous, since the provision of the substantially water-free binding phase of the present invention represents the primary improvement over the prior art. However, when a welding electrode coating possessing the minimum moisture is desired, it is preferred to employ anhydrous flux materials, that is, flux materials which are free of chemically-combined water, such as water of crystallization in the case of certain of the silicates.

In preparing the coating in accordance with the present invention the flux materials selected will be in relatively fine particle size. As is well known, the exact particle size of the particular flux ingredient, may vary somewhat depending upon considerations known in the welding art. Often it is desired to employ a combination of extremely fine material with somewhat coarser materials, and the particle size distribution selected will present no problem to one skilled in the art. In general, the particle size of the fluxing materials will not be greater than about 40 mesh. While the fineness of the particle size of the fluxing ingredients may be anything below this figure, usually the average particle size thereof will not be less than about 325 mesh.

The glass frit, as stated, is mixed with the flux ingredients, and for this purpose any mixing device, such as a Z-bladed mixer or edge runner mill, may be employed. The proportions of glass frit to flux ingredients in the mixture may vary somewhat depending upon the particular properties desired. For example, where minimum bonding is required, amounts of glass frit as low as about 2%, by weight, based on the weight of the mixture, may be employed, although for most practical purposes, the glass frit will generally not be less than about 7%. On the other hand, when maximum bonding is desired and when the glass itself may function to a significant extent as a fluxing ingredient, amounts of the glass as high as about 40% may be employed. In the preferred practice of the invention, the glass will make up between about 15 and about 25%, by weight, of the mixture of glass and flux ingredients.

In applying the mixture of glass frit and fluxing ingredients to the electrode, a liquid is incorporated in the mixture. The amount of the liquid will be sufficient to provide a plastic mass capable of being applied to the electrode. That is to say, the liquid will be sufficient to convert the dry, loose material into a coherent, plastic mass which may range from a stiff, dough-like body suitable for application by extrusion, to a thin, fluid slurry suitable for application by dipping, spraying, brushing, and the like. The liquid selected for this purpose may be any liquid since its presence and function is only temporary, it being driven off after the mixture is applied to the electrode. Generally, for the sake of economy and ease of handling, the liquid employed will be water. However, in certain situations, drying problems may make the use of more volatile, organic liquids feasible.

To impart supplemental plasticity and preliminary binding it is often desirable to incorporate a small amount of an organic binding material in the mix. Since the function and presence of this binding material is only temporary, it also being driven off after the mixture is applied to the electrode, the particular material employed may be selected from a wide variety of organic binding materials including natural and synthetic resins; bituminous materials; gums, such as gum arabic, gum tragacanth, and the like; viscous liquids; alginates, and the like. The alginates, such as sodium alginate and calcium alginate, are particularly applicable for use. The organic binding material, if a solid, such as the alginates, may be incorporated in the glass frit, in the flux materials or in the dry mixture of glass frit and flux materials. On the other hand, it may be added with the liquid, for example, dissolved or dispersed in water, or it may be added after the liquid has been added. The amount of organic binding material employed will vary depending upon the particular material selected, upon the mode of application, upon the degree of initial bonding desired, and the like. In most cases, it will not run over about 5%, by weight, based on the weight of the mixture of glass frit and fluxing materials. When an alginate is employed, for example, between about 0.5% and about 2%, thereof, is satisfactory.

The plastic mixture comprising the glass frit, fluxing materials and liquid, and organic supplemental plasticizing and binding material, if employed, is applied to the welding electrode as a coating. As stated above, any one of a wide variety of methods for so applying the mix may be employed. Thus, the mixture may be applied by dipping the electrode into a body thereof, or the mixture may be brushed or sprayed onto the electrode. A particularly advantageous way of applying the mixture is by extruding the mix through an annular die over the electrode.

After the plastic coating has been applied to the electrode, the article is heated to drive off the liquid, and any organic binding material employed, and to soften the glass frit particles. Preferably this heating cycle is in two stages, the first being a drying stage wherein the coated article is heated to evaporate the liquid without softening the glass frit particles. The heating during such first sage may be to the boiling point of the particular liquid employed or to a temperature somewhat higher, for example up to about 100° F. above the boiling point. Thus, when water is employed as the liquid, a temperature during the drying stage of between 212° F. and about 300° F., such as about 230° F. is satisfactory.

After the drying stage, the article may then be further heated to a higher temperature where the glass frit particles soften and adhere to the flux particles and to the electrode. The temperature will not be so high as deleteriously to affect, as by melting, oxidizing, decomposing, or the like, the flux ingredients. Since the glass frit will soften between about 1050 and about 1250° F. and since fluxing materials are not affected at temperatures as low as these, these temperatures constitute a satisfactory general range of firing temperatures. It is an important feature of the glass binder of the present invention, that it softens at such relatively low temperatures. Preferably, to insure adequate softening while insuring no deleterious effect on the flux ingredients, the temperature employed during firing is between about 1100° F. and about 1200° F.

During firing the glass frit particles soften and flow, wetting and adhering to the flux particles and welding electrode. The fluxing ingredients are not softened at the stated temperatures and hence remain as discrete particles. During the firing stage any organic binder presence will be volatilized, and in this connection, when an organic binder is employed, the atmosphere of the firing zone will be neutral or oxidizing to facilitate its removal. Upon cooling the product, the glass solidifies firmly bonding the flux particles to each other and to the electrode providing a continuous flux-containing coating.

As is well-known in the welding electrode art, certain elements, such as sulphur and phosphorus, have a deleterious effect on the weld metal, and hence materials containing such elements are normally not employed as flux ingredients, binders or additives of any other type in the coating. Thus, it will be realized by those skilled in the art, that in the practice of the present invention, the general rule will be observed, and materials containing elements deleterious to the weld metal, notably sulphur and phosphorus, will not be employed.

The present invention is not concerned with the particular electrode to which the coating is applied. The electrode itself, as is well known, may vary widely as to size, form, and composition. So far as size is concerned, the presently commercial electrodes range from a wire of about 3/32" in diameter up to a rod having a diameter of about 7/16". The electrodes are generally cylindrical in form, and generally solid, although hollow rods may be employed in certain instances. The metal from which the electrode is made depends upon various factors including the type of metal to be welded. Thus when carbon steel is to be welded, the electrode will also be of carbon steel, that is, a steel containing between about 0.1% and about 0.35% carbon. On the other hand where alloys are to be welded, the electrodes may be of such alloy. For example, where stainless steel is to be welded, the electrode may comprise, in addition to iron, 13% chromium, 18% chromium, 18% chromium and 8% nickel, or 25% chromium and 20% nickel, depending upon the particular alloy to be welded.

The preparation of the novel coating material and the application of the coating to welding electrodes in accordance with the present invention will be more clearly understood from a consideration of the following specific examples which are given for the purpose of illustration only and are not intended to limit the scope of the invention in any way.

The following tables set forth the composition of thirteen representative glasses used in the preparation of coatings for welding electrodes in accordance with the present invention.

TABLE I

|  | A | B | C | D |
|---|---|---|---|---|
| $Li_2O$: |  |  |  |  |
| Mol Formula | 0.25 | 0.25 | 0.25 | 0.25 |
| Mol Percent | 8.8 | 9.4 | 10.2 | 9.4 |
| Weight Percent | 4.3 | 4.5 | 4.7 | 4.2 |
| $Na_2O$: |  |  |  |  |
| Mol Formula | 0.45 | 0.45 | 0.45 | 0.45 |
| Mol Percent | 15.8 | 17.0 | 18.4 | 17.0 |
| Weight Percent | 15.7 | 16.8 | 17.4 | 15.8 |
| $CaF_2$: |  |  |  |  |
| Mol Formula | 0.15 | 0.15 | 0.15 | 0.15 |
| Mol Percent | 5.3 | 5.7 | 6.1 | 5.7 |
| Weight Percent | 6.6 | 7.1 | 7.4 | 6.7 |
| $Na_2F_2$: |  |  |  |  |
| Mol Formula | 0.10 | 0.15 | 0.15 | 0.15 |
| Mol Percent | 3.5 | 5.7 | 6.1 | 5.7 |
| Weight Percent | 4.7 | 7.6 | 7.9 | 7.1 |

TABLE I—Continued

|  | A | B | C | D |
|---|---|---|---|---|
| $B_2O_3$: |  |  |  |  |
|   Mol Formula | 0.15 | 0.15 | 0.15 | 0.10 |
|   Mol Percent | 5.3 | 5.7 | 6.1 | 3.8 |
|   Weight Percent | 5.9 | 6.3 | 6.5 | 3.9 |
| $Fe_2O_3$: |  |  |  |  |
|   Mol Formula |  |  |  | .05 |
|   Mol Percent |  |  |  | 1.9 |
|   Weight Percent |  |  |  | 4.5 |
| $SiO_2$: |  |  |  |  |
|   Mol Formula | 1.40 | 1.20 | 1.00 | 1.20 |
|   Mol Percent | 49.2 | 45.2 | 40.8 | 45.2 |
|   Weight Percent | 47.2 | 43.3 | 37.4 | 40.8 |
| $TiO_2$: |  |  |  |  |
|   Mol Formula | 0.30 | 0.30 | 0.30 | 0.30 |
|   Mol Percent | 10.5 | 11.3 | 12.2 | 11.3 |
|   Weight Percent | 13.5 | 14.4 | 18.7 | 17.0 |
| Other: |  |  |  |  |
|   Mol Formula | (CoO) 0.05 |  |  |  |
|   Mol Percent | 1.8 |  |  |  |
|   Weight Percent | 2.1 |  |  |  |
| Fusion Flow @ 1,100° F. (in mm.) | 19 | 34 | 52 | 27 |

TABLE II

|  | E | F | G | H | I |
|---|---|---|---|---|---|
| $Li_2O$: |  |  |  |  |  |
|   Mol Formula | 0.25 | 0.38 | 0.25 | 0.25 | 0.25 |
|   Mol Percent | 10.2 | 16.5 | 11.0 | 11.7 | 12.4 |
|   Weight Percent | 4.5 | 8.0 | 5.3 | 5.7 | 5.9 |
| $Na_2O$: |  |  |  |  |  |
|   Mol Formula | .40 | 0.32 | 0.40 | 0.40 | 0.40 |
|   Mol Percent | 16.3 | 13.9 | 17.6 | 18.7 | 19.8 |
|   Weight Percent | 15.1 | 14.0 | 17.3 | 18.8 | 19.1 |
| $CaF_2$: |  |  |  |  |  |
|   Mol Formula | 0.15 | 0.15 | 0.15 | 0.15 | 0.15 |
|   Mol Percent | 6.1 | 6.5 | 6.6 | 7.0 | 7.5 |
|   Weight Percent | 7.2 | 8.4 | 8.2 | 8.9 | 9.1 |
| $MnO$: |  |  |  |  |  |
|   Mol Formula | .05 |  | .05 | .05 | 0.05 |
|   Mol Percent | 2.1 |  | 2.2 | 2.3 | 2.5 |
|   Weight Percent | 2.1 |  | 2.5 | 2.7 | 2.7 |
| $Na_2F_2$: |  |  |  |  |  |
|   Mol Formula | 0.15 | 0.15 | 0.15 | 0.15 | 0.15 |
|   Mol Percent | 6.1 | 6.5 | 6.6 | 7.0 | 7.5 |
|   Weight Percent | 7.6 | 8.9 | 8.8 | 9.5 | 9.7 |
| $B_2O_3$: |  |  |  |  |  |
|   Mol Formula | 0.10 | 0.15 | 0.06 | 0.03 | 0.07 |
|   Mol Percent | 4.1 | 6.5 | 2.7 | 1.4 | 3.5 |
|   Weight Percent | 4.2 | 7.4 | 2.9 | 1.6 | 3.7 |
| $Fe_2O_3$: |  |  |  |  |  |
|   Mol Formula | 0.05 |  | 0.03 | 0.015 | 0.035 |
|   Mol Percent | 2.1 |  | 1.3 | .7 | 1.7 |
|   Weight Percent | 4.8 |  | 3.3 | 1.8 | 4.3 |
| $SiO_2$: |  |  |  |  |  |
|   Mol Formula | 1.00 | 0.85 | 1.00 | 1.00 | 0.70 |
|   Mol Percent | 40.8 | 37.0 | 44.1 | 46.8 | 34.7 |
|   Weight Percent | 36.4 | 36.2 | 41.8 | 45.5 | 32.5 |
| $TiO_2$: |  |  |  |  |  |
|   Mol Formula | 0.30 | 0.30 | 0.18 | 0.09 | 0.21 |
|   Mol Percent | 12.2 | 13.1 | 7.9 | 4.2 | 10.4 |
|   Weight Percent | 18.1 | 17.0 | 10.0 | 5.4 | 12.9 |
| Fusion Flow @ 1,100° F. (in mm.) | 38 | 57 | 47 | 54 | 61 |

TABLE III

|  | J | K | L | M |
|---|---|---|---|---|
| $Li_2O$: |  |  |  |  |
|   Mol Formula | 0.10 | 0.25 | 0.25 | 0.25 |
|   Mol Percent | 4.8 | 10.6 | 12.0 | 10.6 |
|   Weight Percent | 2.1 | 5.0 | 5.5 | 4.9 |
| $Na_2O$: |  |  |  |  |
|   Mol Formula | 0.30 | 0.40 | 0.30 | 0.30 |
|   Mol Percent | 14.4 | 17.0 | 14.4 | 12.8 |
|   Weight Percent | 13.3 | 16.4 | 13.4 | 12.0 |
| $K_2O$: |  |  |  |  |
|   Mol Formula | 0.20 |  | 0.10 | 0.10 |
|   Mol Percent | 9.6 |  | 4.8 | 4.3 |
|   Weight Percent | 13.5 |  | 6.8 | 6.1 |
| $CaF_2$: |  |  |  |  |
|   Mol Formula | 0.15 | 0.15 | 0.15 | 0.15 |
|   Mol Percent | 7.3 | 6.4 | 7.2 | 6.4 |
|   Weight Percent | 8.5 | 7.8 | 8.5 | 7.6 |
| $MnO$: |  |  |  |  |
|   Mol Formula | 0.05 | 0.05 | 0.05 | 0.05 |
|   Mol Percent | 2.4 | 2.1 | 2.4 | 2.1 |
|   Weight Percent | 2.5 | 2.3 | 2.6 | 2.3 |
| $Na_2F_2$: |  |  |  |  |
|   Mol Formula |  | 0.15 | 0.15 | 0.15 |
|   Mol Percent |  | 6.4 | 7.2 | 6.4 |
|   Weight Percent |  | 8.3 | 9.1 | 8.1 |
| $Fe_2O_3$: |  |  |  |  |
|   Mol Formula |  | 0.04 | 0.05 | 0.05 |
|   Mol Percent |  | 1.9 | 2.4 | 2.1 |
|   Weight Percent |  | 4.6 | 5.8 | 5.1 |
| $SiO_2$: |  |  |  |  |
|   Mol Formula | 0.80 | 1.00 | 0.80 | 1.00 |
|   Mol Percent | 38.5 | 42.5 | 38.3 | 42.5 |
|   Weight Percent | 34.4 | 39.4 | 34.7 | 38.7 |

TABLE III—Continued

|  | J | K | L | M |
|---|---|---|---|---|
| $TiO_2$: |  |  |  |  |
|   Mol Formula | 0.24 | 0.30 | 0.24 | 0.30 |
|   Mol Percent | 11.5 | 12.8 | 11.5 | 12.8 |
|   Weight Percent | 13.7 | 15.7 | 13.8 | 15.4 |
| Other: |  |  |  |  |
|   Mol Formula | ($Li_2F_2$) 0.20 |  |  |  |
|   Mol Percent | 9.6 |  |  |  |
|   Weight Percent | 7.4 |  |  |  |
| Fusion Flow @ 1,100° F. (in mm.) | 64 | 35 | 51 | 42 |

Example I

A glass frit corresponding to glass E in Table II was prepared by heating, in a fire clay crucible in a gas-fired pot furnace, ingredients providing the stated analysis to about 2000° F. for about one hour to form a clear melt. The clear molten mass is then quenched in water. The resulting relatively coarse, fractured material is then dried and ground to a particle size between about 100 and about 200 mesh.

With 25 parts by weight of the frit are mixed 8.0 parts of FeSi, 6.0 parts of FeMn, 35.0 parts of $CaCO_3$, 11.7 parts of $CaF_2$, 18.0 parts of $TiO_2$ and 1.0 part of sodium alginate. With the resulting mixture are mixed 15 parts of water. The resulting dough-like mass is extruded onto the welding electrodes through an annular die. The coated electrodes are dried overnight at 265° F. and then fired for 5 minutes at 1200° F. in an electric Globar kiln.

After 1 week's exposure to normal atmosphere, the coatings showed a moisture content of only 0.05% when tested in accordance with the procedure given in "Military Specification Electrodes (Mineral-Covered, Low Hydrogen), Welding, Medium, and Alloy Steels" MIL-E-986, for November 1, 1949.

Weld metal deposited from these electrodes showed no cracking, also indicating that the moisture content was insignificant.

Example II

A glass frit corresponding to glass K in Table III was prepared as described in Example I.

To 25 parts, by weight, of this frit are added 8.0 parts of FeSi, 6.0 parts of manganese, 40.0 parts of $CaCO_3$, 16.7 parts of $CaF_2$, 8.0 parts of $TiO_2$, and 1.0 part of sodium alginate. The mixture was converted to a dough-like plastic mass by the addition of 15 parts of water. The mix was applied to welding electrodes as in Example I.

The coated electrodes are divided into two batches, one of which is subjected to normal atmospheric conditions for 10 days from the time they cool from baking temperature, and the other of which is subjected to 93% relative humidity for the same period. Moisture contents are determined from time to time (following the procedure referred to in Example I) with the following results:

|  | Percent $H_2O$ in coating |  |  |  |  |
|---|---|---|---|---|---|
|  | After firing | 1 day | 3 days | 6 days | 10 days |
| Normal atm | .13 | .19 | .03 | .01 | .16 |
| 93% R. H. | .13 | .22 | .20 | .22 | .28 |

Example III

A glass frit corresponding to glass K in Table III is prepared following the procedure described in Example I.

With this frit, four different coating formulations are prepared as follows:

*Coating IIIa.*—8.0 parts of FeSi, 6.0 parts of manganese, 45.0 parts of $CaCO_3$, 16.7 parts of $CaF_2$, 3.0 parts of $TiO_2$, 1.0 part of sodium alginate and 20 parts of glass frit K.

*Coating IIIb.*—Same as coating IIIa plus 5 additional parts of $CaF_2$.

*Coating IIIc.*—Same as coating IIIa plus 10 additional parts of $CaF_2$.

*Coating IIId.*—Same as coating IIIa plus 15 additional parts of $CaF_2$.

The coating compositions were applied to welding electrodes as in Example I and each set of coated electrodes was tested for moisture content (following the procedure mentioned in Example I), after 16 hours and after 3 weeks' exposure to the atmosphere with the following results:

|  | Percent $H_2O$ in coating ||
|---|---|---|
|  | After 16 hours | After 3 weeks |
| Coating IIIa | .15 | .09 |
| Coating IIIb | .11 | .15 |
| Coating IIIc | .12 | .24 |
| Coating IIId | .14 | .17 |

Example IV

A glass frit corresponding to glass L in Table III is prepared following the procedure described in Example I.

With 15 parts of the glass frit are mixed 4.0 parts of FeSi, 4.0 parts of FeTi, 4.0 parts of manganese, 29.0 parts of $CaCO_3$, 21.7 parts of $CaF_2$, 13.0 parts of rutile, 3.0 parts of $SiO_2$, and 1.0 part sodium alginate.

The mixture is applied to welding electrodes as in Example I, being fired, however, at 1100° F. for 4 minutes. The coatings are tested for moisture content (following the procedure referred to in Example I) after 16 hours and after 3 weeks' exposure to the atmosphere with the following results:

| Percent $H_2O$ in coating ||
|---|---|
| After 16 hours | After 3 weeks |
| .16 | .19 |

Example V

A glass frit corresponding to glass E in Table II is prepared following the procedure described in Example I.

To 25 parts of the glass frit are mixed 8.0 parts of FeSi, 6.0 parts of manganese, 35.0 parts of $CaCO_3$, 11.7 parts of $CaF_2$, 18.0 parts $TiO_2$ and 1.0 part sodium alginate.

The coating composition is extruded onto electrodes as in Example I, and the electrodes are divided into two batches for firing. One batch is fired at 1100° F. for 5 minutes and has a moisture content of 0.21% upon cooling, and a moisture content of .21% after 1 week's exposure to 93% relative humidity. The other batch is fired at 1150° F. for 5 minutes and has a moisture content of 0.19% upon cooling, and a moisture content of .22% after 1 week's exposure to 93% relative humidity.

Example VI

Three series of electrode coating formulations, differing only in the composition of the glass frit, are prepared with the following materials:

|  | Parts |
|---|---|
| FeSi | 4.0 |
| FeMa | 2.0 |
| $CaCO_3$ | 35.0 |
| $TiO_2$ | 18.0 |
| $CaF_2$ | 11.7 |
| Sodium alginate | 1.0 |
| Glass frit | 25.0 |

In the first series (VIa) the glass frit corresponded to glass A in Table I; in the second series (VIb) the glass frit corresponded to glass C, and in the third series (VIc) the glass frit corresponded to glass D.

The coatings are applied to welding electrodes as in Example I. The burn-off rates of the electrodes are measured and compared with the burn-off rate of a commercial sodium-silicate-bonded electrode containing the same flux ingredients. The results are as follows:

| Series | Burn-off rate (inch/min.) |
|---|---|
| Sodium silicate-bonded electrode | 9.4 |
| VIa | 9.7 |
| VIb | 10.2 |
| VIc | 9.7 |

Considerable modification is possible in the selection of the particular ingredients employed in preparing the glass frit, in the selection of the particular fluxing materials employed as well as in the particular technique followed without departing from the scope of the present invention.

I claim:

1. A flux-containing welding electrode coating comprising discrete particles of welding flux ingredients bonded to each other and to a welding electrode by means of from about 7% to about 40% of a hydrophobic water-insoluble glass which softens and flows under its own weight when heated at 1200° F. for five minutes.

2. The coating of claim 1 wherein the said glass, when subjected to 90% relative humidity for one week at a fineness of about 200 mesh, absorbs less than about 1% of moisture.

3. The coating of claim 1 wherein the said glass, when leached with pure water at 80° F. for two days at a fineness of about 200 mesh, exhibits a weight loss of less than about 3%.

4. The coating of claim 3 wherein the said glass, when subjected to 90% relative humidity for one week at a fineness of about 200 mesh absorbs less than about 1% of moisture.

5. A flux-containing welding electrode coating comprising discrete particles of welding flux ingredients bonded to each other and to a welding electrode by means of from about 7% to about 40% of a hydrophobic water-insoluble glass which softens and flows under its own weight when heated at 1200° F. for five minutes and having an analysis comprising oxides of at least two of the alkali metals selected from the group consisting of sodium, potassium, lithium and rubidium in an amount between about 20 mol percent and about 40 mol percent; at least one of the divalent metal oxides selected from the group consisting of CaO, MgO, SrO, CdO, MnO, FeO, CoO, and NiO in an amount between about 5 mol percent and about 20 mol percent, the total of said alkali metal and divalent metal oxides being between about 30 mol percent and about 55 mol percent, and the mol ratio of said alkali metal oxides to said divalent metal oxides being between about 2:1 and about 8:1, $SiO_2$ in an amount between about 30 mol percent and about 60 mol percent, and $TiO_2$ in an amount between about 2 mol percent and about 25 mol percent.

6. The coating of claim 5 wherein said glass comprises fluorine up to an amount equivalent to about 20 mol percent of $Na_2F_2$.

7. The coating of claim 5 wherein said glass comprises $B_2O_3$ in an amount up to about 40 mol percent.

8. The coating of claim 5 wherein said glass comprises a trivalent oxide selected from the group consisting of $Fe_2O_3$ and $Al_2O_3$ in an amount up to about 10 mol percent.

9. A flux-containing welding electrode coating comprising discrete particles of welding flux ingredients bonded to each other and to a welding electrode by means of from about 7% to about 40% of a hydrophobic, water-insoluble glass which softens and flows under its own weight when heated at 1200° F. for five minutes and having an analysis comprising oxides of at least two of the alkali metals selected from the group consisting of sodium, potassium, lithium and rubidium in an amount between about 20 mol percent and about 40 mol percent; at least one of the divalent metal oxides selected from the group consisting of CaO, MgO, SrO, CdO, MnO, FeO, CoO and NiO in an amount between about 5 mol percent and about 20 mol percent, the total of said alkali metal and divalent metal oxides being between about 30 mol percent and about 55 mol percent, and the mol ratio of said alkali metal oxides to said divalent metal oxide being between about 2:1 and about 8:1, $SiO_2$ in an amount between about 30 mol percent and about 60 mol percent, $TiO_2$ in an amount between about 2 mol percent and about 25 mol percent, and fluorine up to an amount equivalent to about 20 mol percent of $Na_2F_2$.

10. The coating of claim 9 wherein said glass comprises $B_2O_3$ in an amount up to about 40 mol percent.

11. The coating of claim 9 wherein said glass comprises a tri-valent metal oxide selected from the group consisting of $Fe_2O_3$ and $Al_2O_3$ up to about 10 mol percent.

12. The method of making a flux-containing welding electrode coating which comprises mixing, with welding flux ingredients in relatively fine particle size, from about 7% to about 40% of a hydrophobic water-insoluble glass frit which softens and flows under its own weight when heated at 1200° F. for five minutes; applying the resulting mixture to a welding electrode, and heating to soften the glass frit causing it to wet and adhere to said flux particles and welding electrode but at a temperature below that at which the flux particles melt.

13. The method of claim 12 wherein the glass frit selected, when subjected to 90% relative humidity for one week at a fineness of about 200 mesh, absorbs less than about 1% of moisture.

14. The method of claim 13 wherein the glass frit selected, when leached with pure water at 80° F. for two days at a fineness of about 200 mesh, exhibits a weight loss of less than about 3%.

15. The method of making a flux-containing welding electrode coating which comprises mixing, with welding flux ingredients in relatively fine particle size, from about 7% to about 40% of a hydrophobic, water-insoluble glass frit which softens and flows under its own weight when heated at 1200° F. for five minutes and having an analysis comprising oxides of at least two of the alkali-metals selected from the group consisting of sodium, potassium, lithium and rubidium in an amount between about 20 mol percent and about 40 mol percent; at least one of the divalent metal oxides selected from the group consisting of CaO, MgO, SrO, CdO, MnO, FeO, CoO and NiO in an amount between about 5 mol percent and about 20 mol percent, the total of said alkali metal and divalent metal oxides being between about 30 mol percent and about 55 mol percent, and the mol ratio of the said alkali metal oxides to said divalent metal oxide being between about 2:1 and about 8:1, $SiO_2$ in an amount between about 30 mol percent and about 60 mol percent, and $TiO_2$ in an amount between about 2 mol percent and about 25 mol percent, applying the resulting mixture to a welding electrode, and heating to soften the glass frit causing it to wet and adhere to said flux particles and welding electrode but at a temperature below that at which the flux particles melt.

16. The method of claim 15 wherein said glass frit comprises fluorine in an amount up to that equivalent to about 20 mol percent of $Na_2F_2$.

17. The method of claim 15 wherein said glass frit comprises up to about 40 mol percent of $B_2O_3$.

18. An improved flux-coated welding electrode comprising a welding electrode having a coating thereon comprising discrete particles of welding flux ingredients bonded to each other and to a welding electrode by means of from about 7% to about 40% of a hydrophobic, water-insoluble glass which softens and flows under its own weight when heated at 1200° F. for five minutes.

19. The product of claim 1 wherein the glass is present in an amount between about 15% and about 25%.

20. The product of claim 5 wherein said glass is present in an amount between about 15% and about 25%.

References Cited in the file of this patent

UNITED STATES PATENTS

| Number | Name | Date |
|---|---|---|
| 1,119,905 | Vollrath | Dec. 8, 1914 |
| 1,741,031 | Miller | Dec. 24, 1929 |
| 1,872,320 | Mino | Aug. 16, 1932 |
| 1,903,620 | Esslinger | Apr. 11, 1933 |
| 1,938,691 | Dougherty | Dec. 12, 1933 |
| 2,063,252 | Kinzie | Dec. 8, 1936 |
| 2,249,007 | Kinzie et al. | July 15, 1941 |
| 2,294,914 | Kerr | Sept. 8, 1942 |
| 2,321,763 | McIntyre | June 15, 1943 |
| 2,324,812 | Bahnseb et al. | July 20, 1943 |
| 2,343,908 | Kinzie et al. | Mar. 14, 1944 |
| 2,414,633 | Bryant | Jan. 21, 1947 |
| 2,452,493 | Rollason | Oct. 26, 1948 |
| 2,466,043 | Rosenberg | Apr. 5, 1949 |
| 2,483,393 | Baldwin | Oct. 4, 1949 |
| 2,510,960 | Danhier | June 13, 1950 |

FOREIGN PATENTS

| Number | Country | Date |
|---|---|---|
| 579,635 | Great Britain | Aug. 9, 1946 |
| 590,651 | Germany | 1934 |
| 702,057 | Germany | 1941 |
| 872,981 | France | 1942 |